US008809725B2

(12) United States Patent  
Khakhalev et al.

(10) Patent No.: US 8,809,725 B2  
(45) Date of Patent: Aug. 19, 2014

(54) WELDING ELECTRODE ASSEMBLY HAVING SELF-ALIGNING FEATURES

(75) Inventors: Alexander D. Khakhalev, Troy, MI (US); Vitaly V. Neverovich, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1623 days.

(21) Appl. No.: 11/969,296

(22) Filed: Jan. 4, 2008

(65) Prior Publication Data

US 2009/0173720 A1    Jul. 9, 2009

(51) Int. Cl.  
*B23K 11/00* (2006.01)  
*B23K 11/31* (2006.01)

(52) U.S. Cl.  
CPC ..................................... *B23K 11/31* (2013.01)  
USPC .................................... 219/78.01; 219/76.17

(58) Field of Classification Search  
USPC .......... 219/86.25, 86.31, 86.51, 89, 119, 120, 219/78.01  
See application file for complete search history.

(56) References Cited

U.S. PATENT DOCUMENTS

| | | | | |
|---|---|---|---|---|
| 2,025,288 A | * | 12/1935 | Johnson | 92/250 |
| 2,045,523 A | * | 6/1936 | Fassler | 219/86.9 |
| 4,623,775 A | * | 11/1986 | Lange | 219/120 |
| 6,056,184 A | | 5/2000 | Luchinger et al. | |
| 6,903,299 B2 | * | 6/2005 | Brown | 219/119 |

FOREIGN PATENT DOCUMENTS

EP        852983 A1     7/1998

* cited by examiner

*Primary Examiner* — Henry Yuen  
*Assistant Examiner* — Thien S Tran  
(74) *Attorney, Agent, or Firm* — Lionel D. Anderson; Reising Ethington P.C.

(57) ABSTRACT

A welding electrode assembly that includes a tip member and a coupling member and has certain self-aligning features which promote proper alignment during operation. In one embodiment, the coupling member acts as a self-aligning joint or connection and generally includes a housing, a movable plunger, and a biasing element such as a spring. During operation, contact between the tip member and a work piece surface causes the plunger to lift from an opening in the housing against the urging force of the spring so that the tip member can become properly aligned with the work piece.

19 Claims, 2 Drawing Sheets

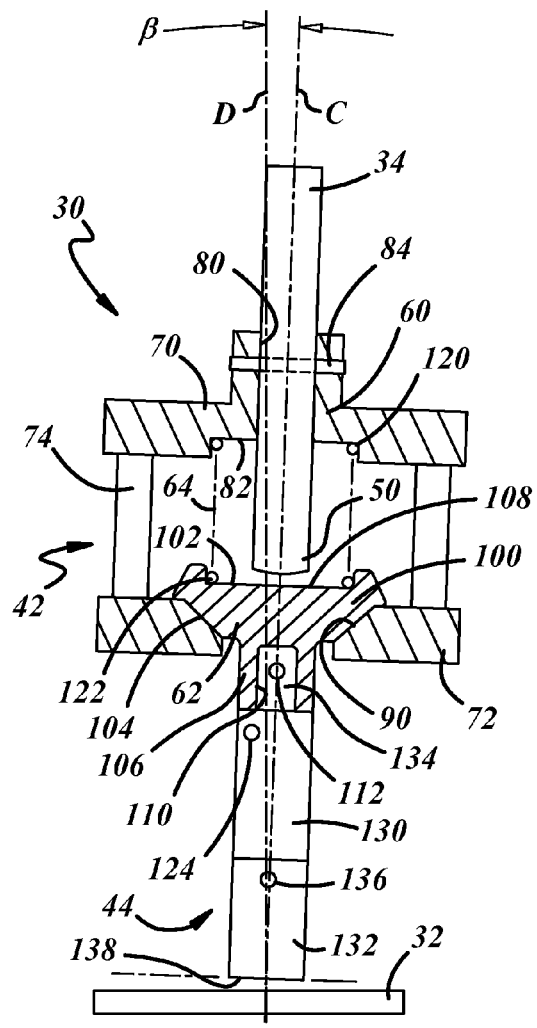
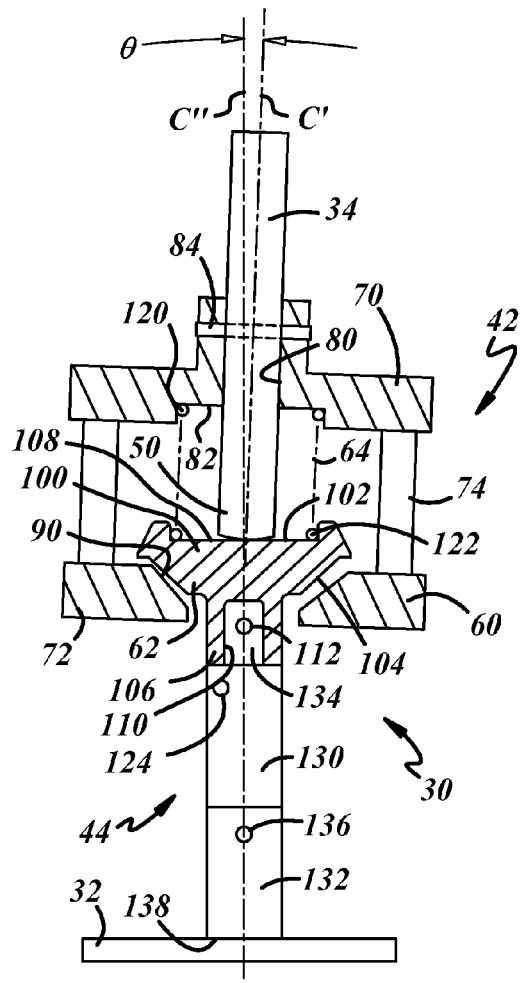
*FIG. 4*     *FIG. 5*

WELDING ELECTRODE ASSEMBLY HAVING SELF-ALIGNING FEATURES

TECHNICAL FIELD

The present invention generally relates to a welding apparatus and, more particularly, to a welding electrode assembly having certain self-aligning features.

BACKGROUND

Resistance welding typically involves the joining or coalescing of metals through the application of electrical current and pressure. Heat is produced by the resistance of the metal work pieces to the electrical current, which is conducted through an electrical circuit that includes the metal work pieces and welding electrodes. It should be appreciated that there are a number of different types of welding processes that could be characterized as resistance welding. Some of these resistance welding examples include, but are certainly not limited to, projection welding, spot welding, seam welding, flash welding, and upset welding.

It is possible for a weld or weldment to suffer from a defect caused during the resistance welding process. One potential cause of such a defect may involve the orientation of the welding electrodes when they contact the metal work piece surfaces in a non-perpendicular or otherwise misaligned manner. If the welding electrode end surfaces are not flush or otherwise properly aligned with the surfaces of the metal work pieces, the resulting welds may exhibit certain undesirable characteristics. For example, welds produced by misaligned welding electrodes can exhibit certain degrees of metal distortion, weakened weld integrity, expulsion, as well as aesthetic issues. Furthermore, misalignment of welding electrodes can accelerate wear-and-tear on the resistance welding equipment in the form of electrode degradation and weld cylinder damage, to name but a few possibilities.

SUMMARY OF THE INVENTION

According to one embodiment, there is provided a welding electrode assembly that comprises a tip member and a coupling member. The coupling member has a housing that is fixedly attached to the drive member and includes an opening for receiving the plunger, the plunger is fixedly attached to the tip member and is seated within the opening, and the biasing element is disposed within the coupling member between the housing and the plunger. Application of force by the drive member can cause: i) the tip member to contact the work piece surface, ii) the plunger to lift from the opening against the urging of the biasing element, and iii) the tip member to become properly aligned with the work piece surface.

According to another embodiment, there is also provided a welding electrode assembly that comprises a tip member and a coupling member. In this embodiment, application of force by a drive member causes: i) the tip member to contact a work piece surface, ii) a plunger and housing to separate so that an angle $\theta$ forms between the center axes of the housing and the plunger, and iii) the tip member to become properly aligned with the work piece surface.

BRIEF DESCRIPTION OF THE DRAWINGS

Preferred exemplary embodiments of the invention will hereinafter be described in conjunction with the appended drawings, wherein like designations denote like elements, and wherein:

FIG. 4 shows a sectional view of the welding electrode assembly of FIG. 3, where the welding electrode assembly is not contacting the upper surface of the metal work piece; and FIG. 5 shows a sectional view of the welding electrode assembly of FIG. 3, where the welding electrode assembly is contacting the upper surface of the metal work piece.

DETAILED DESCRIPTION OF THE PREFERRED EMBODIMENTS

Figure 1:
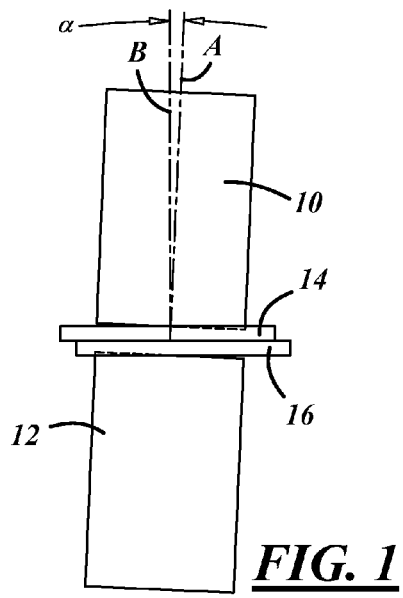
FIG. 1 is an exemplary illustration of a pair of resistance welding electrodes that are misaligned with metal work pieces.
Figure 3:
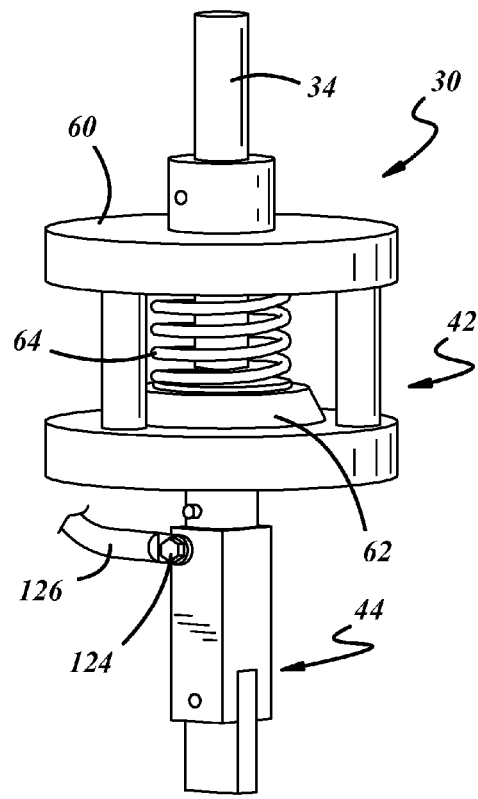
FIG. 3 shows a more detailed isometric view of the welding electrode assembly of FIG. 2.
Figure 2:
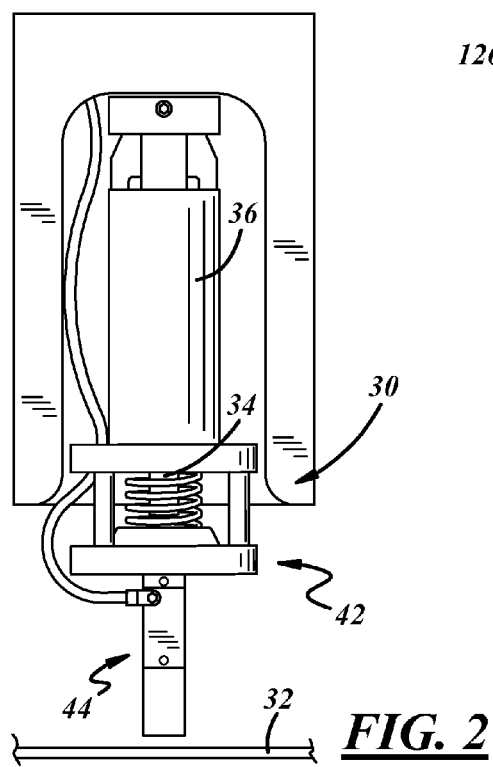
FIG. 2 shows an exemplary embodiment of a welding electrode assembly mounted above a metal work piece.

The welding electrode assembly described herein includes a coupling member with certain self-aligning features which promote proper alignment during operation between the welding electrode assembly and a work piece surface. To put this in context, FIG. 1 illustrates an example where a pair of resistance welding electrodes 10 and 12 are misaligned with surfaces of metal work pieces 14 and 16; these resistance welding electrodes are not equipped with the self-aligning features described herein. This misalignment can result in a non-uniform contact or interface between the resistance welding electrodes and the metal work pieces. Resistance welding electrode 10 has a center axis A that is misaligned or offset with respect to line B, which is perpendicular to the upper surface of metal work piece 14. The misalignment or offset is represented by angle $\alpha$, and can form a non-uniform interface where some portions of resistance welding electrode 10 penetrate deeper into the metal than other electrode portions. This, in turn, can affect the amount, distribution, path, and/or other attributes of the electrical current flowing through the metal work pieces during resistance welding operations, and can cause various types of defects to the welds and weldments and accelerate wear-and-tear to the resistance welding equipment, as already explained. The welding electrode assembly discussed below seeks to avoid certain misalignment-related problems, including some of the aforementioned problems.

It should be appreciated that while the welding electrode assembly is described below in the context of a resistance welding apparatus, it could also be used in other types of non-resistance welding operations where proper alignment between a welding electrode and a work piece is desired. The term "resistance welding" broadly includes projection welding, spot welding, seam welding, flash welding, upset welding, and any other form of welding that involves the joining or coalescing of materials through the application of electrical current and pressure. With reference to FIGS. 2-5, there is shown an exemplary embodiment of a welding electrode assembly 30 that is mounted above a metal work piece 32 and is driven up and down by a drive member 34 coupled to a pneumatic cylinder 36. According to this particular embodiment, welding electrode assembly 30 is part of a resistance welding system and generally includes a coupling member 42 and a tip member 44.

Drive member 34 is coupled to a force-exerting device, such as a pneumatic, hydraulic, electric, or other drive mechanism, and moves welding electrode assembly 30 up and down so that tip member 44 can be urged against the surface of metal work piece 32 during welding operations. According to this particular embodiment, drive member 34 is an elongated steel rod that acts as a piston-like output component of pneumatic cylinder 36 and includes an axial end 50. It should be appreciated that drive member 34 can either be part of a force-exerting device, as in this example where it is an output component of pneumatic cylinder 36, or it can be a separate component that is coupled to a force-exerting device. Axial end 50 extends into coupling member 42 and can act as a stop for certain internal components of the coupling member, as will be subsequently explained. The particular axial end embodiment shown here includes a slightly rounded end surface, however, other end surfaces configurations could also be used so long as they provide for the self-alignment of tip member 44, as described below.

Coupling member 42 includes self-aligning features that enable it to connect drive member 34 to tip member 44 in such a way that the tip member becomes aligned with a surface of metal work piece 32 during welding operations. It should be appreciated that coupling member 42 can directly connect drive member 34 to tip member 44 (as shown in this embodiment), it can indirectly connect the drive member to the tip member with the use of additional intervening components, or it can connect the drive member to the tip member according to some other arrangement utilizing coupling member 42. According to the embodiment shown here, coupling member 42 acts as a self-aligning joint or connection and generally includes a housing 60, a movable plunger 62, and a biasing element 64 such as a spring. It should be recognized that while housing 60 is shown here as a multi-part housing assembly having upper and lower segments, it could be provided according to one of a number of different embodiments, including embodiments having an integrated or unitary housing design.

Housing 60 generally carries and maintains in place the components of coupling member 42 and, according to this embodiment, includes an upper housing piece 70, a lower housing piece 72, and one or more buttresses 74. Upper housing piece 70 is shown as a generally disk-shaped object having a bore 80 that receives drive member 34, and a recessed section 82 that receives biasing element 64. Bore 80 extends through upper housing piece 70 and is sized and shaped to securely receive a segment of drive member 34 so that the drive member can directly transfer its driving force to plunger 62. In this embodiment, drive member 34 and upper housing piece 70 are securely attached to one another by means of one or more screws or pins 84 so that no relative movement occurs between these two components. Alternatively, bore 80 could be replaced with a blind hole or some other feature for securely attaching to drive member 34, as it is not necessary for axial end 50 of the drive member to pass entirely through upper housing piece 70. Because axial end 50 acts as a stop device for plunger 62, as will be explained, the preceding alternative embodiment would likely require housing 60 to be modified so that some other component acts as a stop device and limits the range of motion of the plunger. Furthermore, attention would be needed to make sure that the driving force exerting by the drive member, which can sometimes be as high as 1,600 lbs., is adequately transferred to the plunger. Recess 82 is designed to receive and maintain an upper axial end of biasing element 64, and is shown here as an annular recess that is located on the underside of upper housing piece 70 and is arranged in a generally concentric manner with bore 80. Of course, other features instead of recess 82 could also be used to maintain biasing element 64 in place.

Lower housing piece 72 is a generally disk-shaped object that is securely fastened to upper housing piece 74 and includes an opening or saddle 90 for receiving movable plunger 62. In this embodiment, the upper and lower housing pieces 70 and 72 are aligned in a generally parallel orientation to one another, and are secured by several spindle-like buttresses 64 arranged near their outer peripheries. As previously mentioned, this type of multi-part housing component could be replaced with a unitary structure or some other suitable housing structure known to those skilled in the art. Opening 90 includes an internal seating surface that is designed to complement or mate with an external seating surface of plunger 62 so that the plunger can nest or settle into the opening with the encouragement of biasing element 64. In this example, the internal seating surface is chamfered and corresponds with a tapered external seating surface of plunger 62, however, other openings having non-chamfered designs could be used as well.

Plunger 62 is a movable component that is securely attached to tip member 44 and moves up and down within opening 90 against the spring pressure of biasing element 64. According to the embodiment shown here, plunger 62 includes a diametrically-enlarged shoulder portion 100 having a recess 102 and a tapered external seating surface 104, and a neck portion 106 extending downwards from the shoulder portion. Recess 102 is formed in an upper surface of shoulder portion 100 and is designed to receive and maintain a lower axial end of biasing element 64. Thus, recesses 82 and 102 cooperate with one another to maintain the biasing element in place so that it can apply a downwardly urging force against plunger 62. Towards the center of recess 102 is a contact surface 108 that contacts axial end 50 of the drive member in a way that limits the range of motion of plunger 62. Contact surface 108 can simply be a flat or planar surface opposing round axial end 50, or it can be indented or otherwise contoured in order to better receive the axial end of drive element 34. It should be recognized that contact surface 108, as well as any other surface of plunger 62 or lower housing piece 72 that acts as a contact surface, can be surface hardened with a process such as chromium coating, nitrizing, carburizing, laser quenching, or some other process for improving use or durability.

Neck portion 106 is diametrically-reduced, when compared to shoulder portion 100, and is designed to extend through opening 90 and securely attach to an upper end of tip member 44. In this embodiment, neck portion 106 includes a recess or blind bore 110 for receiving a diametrically-reduced stem portion 134 extending from the top of tip member 44, however, other suitable attachment features could be used instead. The neck portion 106 and tip member 44 can be secured to one another via screws or pins 112. It should be noted that the recess/stem/screw combination just described is but one example of a suitable connection between plunger 62 and tip member 44, as other connections known to skilled artisans could also be used to secure these components together.

Biasing element 64 is generally disposed between housing 60 and plunger 62 and generally exerts a separation force against these two components so that the plunger is urged against opening 90. In a preferred embodiment, biasing element 64 is a spring with an upper axial end 120 fitted within recess 82 and a lower axial end 122 seated within recess 102. Biasing element 64 could be arranged somewhat differently from the orientation shown in the drawings, so long as it is able to exert an appropriate force against plunger 62. Although springs are probably the most common type of suitable biasing element, other elements capable of exerting a force on plunger 62 could be used as well. In one example, the biasing element 64 is a spring that exhibits a spring force of about 20-150 lbs.; but the spring could vary depending on the particular application.

Tip member 44 is designed to conduct electrical current so that it can be pressed against a surface of metal work piece 32 under the power of drive member 34 and perform a resistance welding operation. In this embodiment, tip member 44 is a multi-piece welding electrode and includes an electrode holder 130 and a replaceable electrode 132. Electrode holder 130 is securely fastened to neck portion 106 through the use of a protruding stem 134 and fasteners 112, as previously explained, and includes an electrical connection 124 for receiving a power supply 126 that provides the tip member with suitable welding current. In one instance, power supply 126 feeds 5 kA-25 kA of electrical current through tip member 44 and the metal work pieces so that they are fused or otherwise joined together. Suitable materials for electrode holder 130 include copper (Cu) and Cu-alloys, but other materials could be used as well. Replaceable electrode 132 is carried by electrode holder 130 and is designed to contact the surface of metal work piece 32 so that pressure and electrical current can be imparted to the work piece during a welding operation. According to this example, replaceable electrode 132 is non-pivotally attached to electrode holder 130 via a screw or pin 136 and is provided with a generally flat or planar contact surface 138. Skilled artisans will appreciate that other types of contact surfaces, including curved surfaces, grooved surfaces, embossed surfaces, etc. may also be used. Some examples of suitable materials for replaceable electrode 132 include, but are certainly not limited to, Cu and Cu-alloys such as those further including chromium (Cr), nickel (Ni), and zirconium (Zr).

In use, welding electrode assembly 30 performs a resistance welding operation by working in conjunction with an opposing welding electrode assembly (not shown) that is located below the work pieces being welded and is part of an overall resistance welding system, as is known and understood by those skilled in the art. The following description is directed to the upper welding electrode assembly, however, it could just as easily apply to the lower welding electrode assembly as well. Moreover, it is not necessary for the welding electrode assemblies to be arranged in the exemplary upper/lower arrangement described herein, as they could be mounted and operated in one of any number of different orientations. Beginning with FIG. 4, welding electrode assembly 30 is shown in a non-welding position; that is, contact surface 138 is spaced from the upper surface of work piece 32. In this position, plunger 62 is seated or nested within opening 90 so that all of the components of welding electrode assembly 30 are generally aligned along a single center axis C. In the event that welding electrode assembly 30 is misaligned with work piece 32, an angle $\beta$ is formed between center axis C and a line D which is perpendicular to the work piece surface.

Turning to FIG. 5, application of a downwards force by drive member 34 causes several events to occur. First, the entire welding electrode assembly 30 is lowered until tip member 44, and more specifically contact surface 38 of replaceable electrode 132, contacts the work piece surface. Further downward movement of welding electrode assembly 30 causes plunger 62 to lift from opening 90 against the urging of biasing element 64; in one embodiment, the plunger separates from the opening and forms a gap of about 1 mm-5 mm. Once plunger 62 is unseated from opening 90 it is free to reorient itself so that tip member 44 can become properly aligned with the work piece surface. Put differently, once plunger 62 separates from lower housing piece 72, the different components of welding electrode assembly 30 no longer remain co-aligned along a single center axis C. Drive member 34 and housing 60 remain misaligned to the surface of the work piece along a center axis C', while plunger 62 and tip member 44 become properly aligned with the work piece along a center axis C". An angle $\theta$ forms between center axes C' and C" and, according to one embodiment, is from 0.1°-5°, inclusive.

It should be understood that "proper alignment" between the tip member and work piece surface is not limited to the exemplary embodiment shown in FIG. 5, where center axis C" is perpendicular to the work piece surface. For instance, if contact surface 138 were a slanted surface—that is, not perpendicular to the axis of the tip member—then a proper alignment between the tip member and work piece surface could involve the tip member being oriented along a center axis other than C". This is, of course, only one possible alternative, as numerous others also exist.

It is to be understood that the foregoing description is not a definition of the invention, but is a description of one or more preferred exemplary embodiments of the invention. The invention is not limited to the particular embodiment(s) disclosed herein, but rather is defined solely by the claims below. For instance, instead of the embodiment described above, it is possible for the drive member to be firmly attached to the plunger and for the housing to be firmly attached to the tip member. During operation of such an embodiment, contact between the tip member and a work piece surface would cause the tip member and housing to work against the urging force of a biasing element, as opposed to other way around. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation

The invention claimed is:

1. A welding electrode assembly, comprising:
   a tip member for contacting a work piece surface; and
   a coupling member for connecting the tip member to a drive member, the coupling member is configured as a self-aligning joint and includes a housing, a plunger, and a biasing element;
   the housing is fixedly attached to the drive member to prevent relative axial movement therebetween and includes an opening with an internal seating surface;
   the plunger is fixedly attached to the tip member and includes a shoulder portion with an external seating surface that mates with the internal seating surface of the opening; and
   the biasing element is disposed within the coupling member between the housing and the plunger;
   wherein the external seating surface of the plunger is in contact with the internal seating surface of the opening when the welding electrode assembly is in a non-welding position, and the external seating surface of the plunger is spaced from the internal seating surface of the opening when the welding electrode assembly is in a welding position.

2. The welding electrode assembly of claim 1, wherein the drive member extends through a bore in the housing and opposes the plunger in order to limit its range of motion during operation.

3. The welding electrode assembly of claim 1, wherein the biasing element is a spring and includes a first end secured in a recess of the housing and a second end secured in a recess of the plunger, and exerts a force that urges the plunger against the opening in the housing.

4. The welding electrode assembly of claim 1, wherein the internal seating surface of the opening is chamfered and the external seating surface of the plunger is tapered.

5. The welding electrode assembly of claim 1, wherein the plunger includes a shoulder portion that cooperates with the opening in the housing, and a neck portion that extends through the opening in the housing and is fixedly attached to the tip member.

6. The welding electrode assembly of claim 1, wherein the tip member includes an electrode holder electrically connected to a power supply, and a replaceable electrode for contacting the work piece surface.

7. The welding electrode assembly of claim 1, wherein the application of force by the drive member further causes the plunger and housing to separate so that an angle θ forms between the center axes of the housing member and plunger.

8. The welding electrode assembly of claim 7, wherein the angle θ is from 0.1°-5°, inclusive.

9. A resistance welding system including a power supply, a first drive member, a first welding electrode assembly according to claim 1, a second drive member, and a second welding electrode assembly, wherein the first and second welding electrode assemblies oppose one another so that a plurality of work pieces can be welded therebetween.

10. A welding electrode assembly, comprising:
a tip member for contacting a work piece surface; and
a coupling member for connecting the tip member to a drive member, the coupling member is configured as a self-aligning joint and includes a housing, a plunger, and a biasing element;
the housing is fixedly attached to one of the drive member or the tip member to prevent relative axial movement therebetween and has a center axis;
the plunger is fixedly attached to the other of the drive member or the tip member and has a center axis, a shoulder portion, and a neck portion, wherein the shoulder portion engages an opening in the housing and limits movement by the plunger, and the neck portion extends through the opening in the housing and is connected to the tip member; and
the biasing element is disposed within the coupling member between the housing and the plunger;
wherein the center axes of the housing and the plunger are aligned when the welding electrode assembly is in a non-welding position, and the center axes of the housing and the plunger have an angle θ between them when the welding electrode assembly is in a welding position and is misaligned with respect to the work piece surface.

11. The welding electrode assembly of claim 10, wherein the housing is fixedly attached to the drive member and the plunger is fixedly attached to the tip member.

12. The welding electrode assembly of claim 11, wherein the drive member extends through a bore in the housing and opposes the plunger in order to limit its range of motion during operation.

13. The welding electrode assembly of claim 11, wherein the biasing element is a spring and includes a first end secured in a recess of the housing and a second end secured in a recess of the plunger, and exerts a force that urges the plunger against an opening in the housing.

14. The welding electrode assembly of claim 1, wherein an opening in the housing has an internal seating surface and the plunger has an external seating surface, and the internal and external seating surfaces complement one another so that the plunger can nest within the opening.

15. The welding electrode assembly of claim 14, wherein the internal seating surface of the opening is chamfered and the external seating surface of the plunger is tapered.

16. The welding electrode assembly of claim 11, wherein the tip member includes an electrode holder electrically connected to a power supply, and a replaceable electrode for contacting the work piece surface.

17. The welding electrode assembly of claim 11, wherein the application of force by the drive member further causes the plunger to lift from an opening in the housing against the urging of the biasing element.

18. The welding electrode assembly of claim 10, wherein the angle θ is from 0.1°-5°, inclusive.

19. A resistance welding system including a power supply, a first drive member, a first welding electrode assembly according to claim 10, a second drive member, and a second welding electrode assembly, wherein the first and second welding electrode assemblies oppose one another so that a plurality of work pieces can be welded therebetween.

* * * * *